US012092303B1

(12) United States Patent
Yeutter et al.

(10) Patent No.: US 12,092,303 B1
(45) Date of Patent: Sep. 17, 2024

(54) LIGHT BULB WITH COMBINATION INCANDESCENT AND LED ILLUMINATION

(71) Applicants: Gregory Yeutter, Philadelphia, PA (US); Eric William Beam, Brooklyn, NY (US); Scott Zimmerman, Basking Ridge, NJ (US)

(72) Inventors: Gregory Yeutter, Philadelphia, PA (US); Eric William Beam, Brooklyn, NY (US); Scott Zimmerman, Basking Ridge, NJ (US)

( * ) Notice: Subject to any disclaimer, the term of this patent is extended or adjusted under 35 U.S.C. 154(b) by 0 days.

(21) Appl. No.: 18/493,609

(22) Filed: Oct. 24, 2023

(51) Int. Cl.

| | |
|---|---|
| ***F21V 23/00*** | (2015.01) |
| ***F21V 3/06*** | (2018.01) |
| ***F21Y 101/00*** | (2016.01) |
| ***F21Y 105/18*** | (2016.01) |
| ***F21Y 113/13*** | (2016.01) |
| ***F21Y 113/20*** | (2016.01) |
| ***F21Y 115/10*** | (2016.01) |
| ***H05B 45/3577*** | (2020.01) |

(52) U.S. Cl.
CPC .......... *F21V 23/005* (2013.01); *F21V 3/0615* (2018.02); *H05B 45/3577* (2020.01); *F21Y 2101/00* (2013.01); *F21Y 2105/18* (2016.08); *F21Y 2113/13* (2016.08); *F21Y 2113/20* (2016.08); *F21Y 2115/10* (2016.08)

(58) Field of Classification Search
CPC ....... F21V 3/06–08; F21V 23/004–005; F21Y 2101/00; F21Y 2105/1018; F21Y 2113/10–20; F21Y 2115/00–10; H05B 45/30–3577
See application file for complete search history.

(56) References Cited

U.S. PATENT DOCUMENTS

2014/0211475 A1* 7/2014 Hsieh ...................... F21V 29/70 362/382

* cited by examiner

*Primary Examiner* — Jason M Han

(57) ABSTRACT

The present embodiment is a light bulb, also referred to as a lamp, in an enclosure that houses a Printed Circuit Board (PCB) that supports an array of LED packages in at least 2 correlated color temperatures with a number of arrays of incandescent light emitters.

9 Claims, 6 Drawing Sheets

100

400

LIGHT BULB WITH COMBINATION INCANDESCENT AND LED ILLUMINATION

TECHNICAL FIELD

The present disclosure relates to optical arrangements integrated in the light source, for improving lamp life, color rendering index and the dimming properties of the light.

BACKGROUND

Circadian rhythms in humans are physical, mental, and behavioral fluctuations that occur on a roughly 24—hour cycle. Circadian rhythms respond primarily to changes in light levels. In humans, circadian rhythms influence numerous processes, including sleep and wake times, hormone release, hunger, digestion, and body temperature.

LEDs, also referred to as light emitting diodes, are semiconductors that emit light when powered.

Over the last two decades, scientific studies have revealed the negative impacts of certain types of artificial light on health. Light sources using LEDs address these findings, adjusting color temperature and flicker to produce a light that reduces negative health impacts.

Human circadian rhythms are known to be disturbed by stimuli from modem technologies. Electronic-device screens expose humans to relatively intense sources of blue and green light at all hours. Before electric light, humans were exposed to only natural sources of light, namely sunlight, moonlight and firelight, but artificial light has reduced the hours spent in sunlight, further disrupting circadian rhythms.

Recent scientific studies suggest near—infrared radiation (NIR), emitted by the sun, incandescent lighting, and halogen lighting, may stimulate local melatonin production in cells throughout the human body, including sensitive tissues such as the retina, gray matter, and blood vessels. This localized melatonin production may be unrelated to the circadian production of melatonin, but it has been hypothesized to be beneficial for cell repair, including repair from exposure to ultraviolet radiation. Natural sources of light, such as sunlight and light from wood fires, generally emit an amount of NIR equal to or greater than visible light. Light sources consisting solely of LEDs generally do not emit NIR, and thus may not stimulate localized melatonin production. The use of the term light in this filing is inclusive of the entire solar spectrum and its related complete biological spectrum.

Glass is a preferred enclosure over polymers to preserve the transmission of visible and NIR wavelengths. Glass provides for enhanced thermal performance over polymers.

"Flicker" is rapid, repeated changes in light intensity over time. It is usually invisible and is part of the normal operation of a light source. Flicker may be detectable in the presence of moving objects or in peripheral vision and is known to contribute to headaches, eyestrain and reduced concentration. It is demonstrated in numerous scientific experiments that under flickering light, saccades, or eye movements between two points, do not travel the same distance that they would under steady light. The eyes will overshoot or undershoot the target.

IEEE 1789-2015 is a standard that defines two important flicker metrics: the modulation percentage, which is the interval between the minimum and maximum height of an oscillation; and flicker frequency, which is the frequency of the oscillation in Hz. Because of potential negative consequences of flicker, good lighting schemes are designed to reduce or eliminate it.

Current lighting products purport to reduce sleep-disturbing blue light but may still produce unhealthy levels of flicker, according to IEEE 1789-2015.

Phase-cut dimming is a common method of altering the power and perceived intensity of a light source by altering an alternating current (AC) sine wave. Forward-phase, or leading-edge, dimming is achieved by turning the light on in the middle of a sine wave cycle and off at the end of the cycle. Forward-phase dimming is often achieved via TRIAC (Bidirectional triode thyristor) semiconductors. Reverse-phase, or trailing-edge, dimming circuits turn the light on in the beginning of a sine wave cycle and off in the middle of a cycle. Reverse-phase dimming is often achieved via electronic low voltage (ELV) circuits, which include MOSFETs.

LED light sources are often incompatible with phase-cut dimmers, especially forward-phase dimmers common in residential settings, causing visible flashing or nonlinear dimming operations. Introducing sufficient incandescent lighting or resistive components into an otherwise LED circuit may improve the perceived performance of a phase-cut dimmer.

Luminous flux, measured in lumens (lm), defines the intensity of light produced by a source, while illuminance, measured in lux, is the intensity of light received at the eyes. Lux (lx) is the SI measurement unit of illuminance, measuring luminous flux per area (lumens per square meter) on a surface.

Lumens (lm) measure the perceived power of a light source weighted to human vision. This metric is commonly used to define the intensity of a light bulb. A 60-watt incandescent source produces about 650-800 lumens (lm); a 40-watt source produces approximately 400-450 lm.

Correlated color temperature (CCT) is an approximation of black-body color temperature (CT) based on the eye response to the visible light spectrum, approximately in the range of 400 nm to 700 nm. CT encompasses a range of wavelengths wider than the visible-only spectrum. LEDs, which are non—black-body emitters, and incandescent light sources, which are approximate black-body emitters, may be combined to more closely mimic the complete biological spectrum found in natural light sources, For the purpose of this filing CCT is associated with primarily visible emitters while CT is associated with natural sources and traditional incandescent and halogen lighting.

Power is measured in watts (W), which are equivalent to one joule per second. Incandescent lamps are generally rated by power at full brightness, meaning without dimming effects. When dimmed, an incandescent lamp uses less than the rated power of the lamp.

Energy efficiency, also referred to as luminous efficacy, of a light source is measured in lumens per watt (LPW). Incandescent light sources generally fall into the range of 8-15 LPW. Fluorescent light sources generally fall in the range of 50-105 LPW. LED light sources generally fall in the range of 60-200 LPW.

Most of the power consumed by an incandescent lamp is converted to infrared (IR) radiation, or electromagnetic radiation with wavelengths longer than visible light, for example, greater than about 700 nm but shorter than radio waves. Only a small fraction of power is converted to visible light, roughly between 400 nm and 700 nm. Incandescent lamps approximate black-body radiators. Radiation in the infrared region is emitted as heat in a black-body radiator as well as an incandescent lamp. At low power levels, the ratio of NIR to visible light emitted by incandescent filaments increases and the peak emission wavelength shifts towards longer wavelengths. Compared to modem fluorescent and LED light sources, incandescent light sources are considered energy inefficient because a greater proportion of the power consumed is emitted as infrared radiation than visible light.

General-purpose incandescent and halogen lamps generally have a rated lifetime in the range of 750 to 2,000 hours, presenting maintenance challenges. The rated lifespan of incandescent light sources is generally an order of magnitude lower than the rated lifespan of fluorescent sources which are commonly 7,000 to 35,000 hours. LED light sources are commonly rated 7,000 to 200,000 hours. By combining LED and incandescent sources, lifespan comparable to LED sources may be achieved while approximating the visible and NIR output of incandescent lighting.

LEDs do not burn out but rather decrease in brightness over time. LED lifespan is commonly rated by the time expected to remain above 70% of original brightness. As LED and fluorescent systems require additional electronics, they may not commonly achieve their respective rated lifespan due to failure modes in other electronic components.

Bedtime lighting is designed to minimize circadian input while providing sufficient light for reading. A commonly-recommended indoor task-light level is 500 lx on the horizontal plane. Most home task lighting is between 300 and 700 lx, which has been determined to be uncomfortably bright for the evening. An evening-reading lighting level of 100-200 lx in the horizontal plane is considered ideal for most people.

Equivalent melanopic lux (EML) is a measure of illuminance weighted to the blue-green sensitivity of melanopsin. EML is used to quantify circadian light and is measured on a vertical plane. Illuminance is the total luminous flux per area incident on a surface.

Melanopic lumens are a measure of luminous flux weighted to melanopsin sensitivity, Melanopic lumens can be used to quantify the circadian output of a light source.

An evening-reading light source should produce no more than 200 melanopic lumens. This is much lower than a typical 650-800 lumen “soft white” incandescent, halogen, or LED light source, which generally produces between 330 and 450 melanopic lumens.

A light source ranging from 300 to 450 lumens will produce 100-200 lx in the horizontal plane at 2-4 feet. This is the case for unshaded lamps, in lamps with white and beige shades, and in lamps with white frosted and gray translucent glass globes.

Intrinsically Photosensitive Retinal Ganglion Cells (ipRGCs) are photoreceptors, distinct from rods and cones, which are sensitive to blue and green light. ipRGCs are not used for vision, but they provide an input to the circadian rhythm via the retinohypothalamic tract.

The directional emission characteristics of LED lamps can cause emitted shadows. Light from an LED lamp directed at a surface may have shadows cast within the diffused light depending on the arrangement of the LEDs in the lamp.

Shadowing effect is a term used to describe the effect of structural components of a bulb that block the emission of light in a uniform manner.

“A19” represents a standard light bulb shape, with “19” representing the bulb’s widest diameter (19/8 inches). A common base for an A19 lamp is the E26 screw (E for Edison screw, 26 mm) in North America. It may be an E27 screw (27 mm), B22 bayonet (Bayonet, 22 mm), or another shape.

“B10” refers to a pointed bulb shape, often referred to as “candelabra,” with a diameter of 10/8 inches. B10 lamps typically have an E12 or E26 base.

Electronic components found in lighting systems, generally inductors and capacitors, can audibly emit a buzzing sound. In capacitors, buzzing can be caused by spikes of inrush current, causing the package to flex due to rapid electrostatic attraction and repulsion, sometimes vibrating against the printed circuit board (PCB). In inductors, spikes of current generate rapidly changing magnetic fields, which can cause a similar effect of flexing and vibration.

These and other non-limiting features or characteristics of the present disclosure will be further described below.

SUMMARY

The present embodiment is a light bulb, also referred to as a lamp, in an enclosure that houses a Printed Circuit Board (PCB) that supports an array of LED packages in at least 2 color temperatures with a number of arrays of incandescent light emitters.

In some embodiments the PCB has a reflector and white soldermask. A circuit may be included to generate an analog control voltage that produces warmer light as the emitted light is dimmed. In an example embodiment the circuit suppresses buzzing by filtering inrush current spikes.

In one embodiment an array of LED packages and an array of incandescent packages arranged in a glass container are controlled by a circuit that is configured to generate analog control voltage. The circuit powers the LED packages when cool, bright light is emitted and powers the incandescent packages when warmer, dim light is emitted.

In other embodiments some embodiments one array of LED packages emits a light of a correlated color temperature between 1800K to 2200K and a second array of LED packages emits a light having a correlated color temperature of about 2200 to 4000K; while an array of incandescent packages are configured to emit a light of a color temperature in the range of 1200K to 2300K.

In some embodiments the PCB is double sided. One skilled in the art understands that a single sided PCB with LED and incandescent packages may also produce a usable light source such as a Parabolic Aluminized Reflector (PAR) style bulb. In other embodiments the array of LED packages are 5-sided LED packages. Five-sided LED packages emit light on five sides providing a beam angle that is wider than 180 degrees. In yet other embodiments the LED packages are multiple color temperature LEDs. In yet other embodiments an enclosure is a frosted glass enclosure. A frosted glass enclosure may reduce glare by diffusing light from both an LED array and an incandescent array without blocking the transmission of visible or NIR wavelengths. One skilled in the art understands that a frosted glass enclosure in combination with arrays of LEDs and Incandescent light sources may create a resultant light that appears uniform when some opaque surfaces exist inside the enclosure.

In an example embodiment a PCB is a double sided board having a star shape, mounted on a narrow vertical support referred to as a neck, located in a frosted enclosure. The star shaped board may be said to be a substantially circular shape with a scalloped perimeter atop a narrow vertical structure. In the center of the substantially circular, scalloped edged shape, is an array of incandescent bulbs in front of a reflector. Between each scallop, about the perimeter of the star-shape, a 5-sided LED package is mounted. The scallops allow light from the 5-sided LEDs to emit at steep angles, providing uniform illumination over and through the spherical surface of the enclosure. One skilled in the art understands that such scallops supporting an array of 5-sided LED packages may allow light from one LED to shine to the opposite side of the PCB from which it is mounted. One skilled in the art further understands that the narrow vertical support and substantially circular PCB may provide the appearance of a conventional incandescent bulb and its illumination properties. Additionally the beam angle that is wider than 180 degrees emitted from the 5-sided LED packages prevents shadowing effect.

The combination of LEDs and Incandescent light sources provide a range of warm dim light to cool bright light. The incandescent lamps provide near-infrared radiation and a small amount of visible light while the LED packages provide the majority of the visible light output of the bulb. As Incandescent lamps are wired in parallel with the LEDs the incandescent lamps stabilize the output of phase-cut dimmers and therefore minimize visible flashing when dimmed. One skilled in the art understands that LEDs alone do not commonly provide a significant resistive load compared to incandescent lamps. The resistive load provided by the incandescent lamps absorbs surges in the current thus protecting the LEDs. The LEDs provide the brightest light thus protecting the incandescent lamps by clamping the voltage across the incandescent lamps to ~24V. Furthermore, current passes through the incandescent lamps before the LEDs, this provides a warmer light when the bulb is dimmed while removing flutter common in LED drivers at low currents. By limiting the voltage to significantly less than the incandescent design voltage the lifetime of the incandescent can be greatly extended while also shifting the spectral power distribution further into the near infrared biological window of the body thus more closely mimicking the spectral power distribution at low lighting levels of moonlight, starlight and nighttime light.

The following describes the voltage applied to the system of an example embodiment from dim to bright:

- From 0 to 72 degree phase angle (0-20% of phase cut) 5 28V incandescent lamps connected across the mains draw power.
- From 72 to 288 degrees (20%-80%) the linear dim control voltage ramps up from 0 to 0.25V.
- At 0.25V the LED driver IC produces the full programmed output current (210 mA at about 24V, 5 W).
  - The first 30 mA from the LED driver flows through two incandescent bulbs connected in parallel with two strings of LEDs.
  - At 30 mA the bulbs develop enough voltage to let the LEDs turn on, beginning with an 1800K array of LEDs while an array of 2700K LEDs are blocked by a transistor.
  - At ~70 mA a transistor controlling the array of 2700K LEDs begins to turn the 2700K LEDs on.
  - The two arrays of 1800K and 2700K LEDs ramp up together until a full 210 mA, where the currents balance to produce 2200K light.
  - From 288-360 degrees the LED brightness stays constant while the bulbs across the mains voltage brightens marginally.

The incandescent lights are typically driven to approximately 65% of their full power thus extending the life of the bulbs.

When power is applied to the circuit, the incandescent lamps turn on first, followed by the low color temperature LEDs, followed by the high color temperature LEDs. The relative intensity of each light array depends on the setting of the dimmer, but the arrays always fade on in this order. None of the arrays appear to start instantaneously; instead, they fade up over time. This achieves a visual effect of slowly fading on, whether or not the lamp is attached to a phase-cut dimmer.

These and other non-limiting features or characteristics of the present disclosure will be further described below.

BRIEF DESCRIPTION OF THE DRAWINGS

The following is a brief description of the drawings, which are presented for the purposes of illustrating the disclosure set forth herein and not for the purposes of limiting the same.

DESCRIPTION

Figure 1:
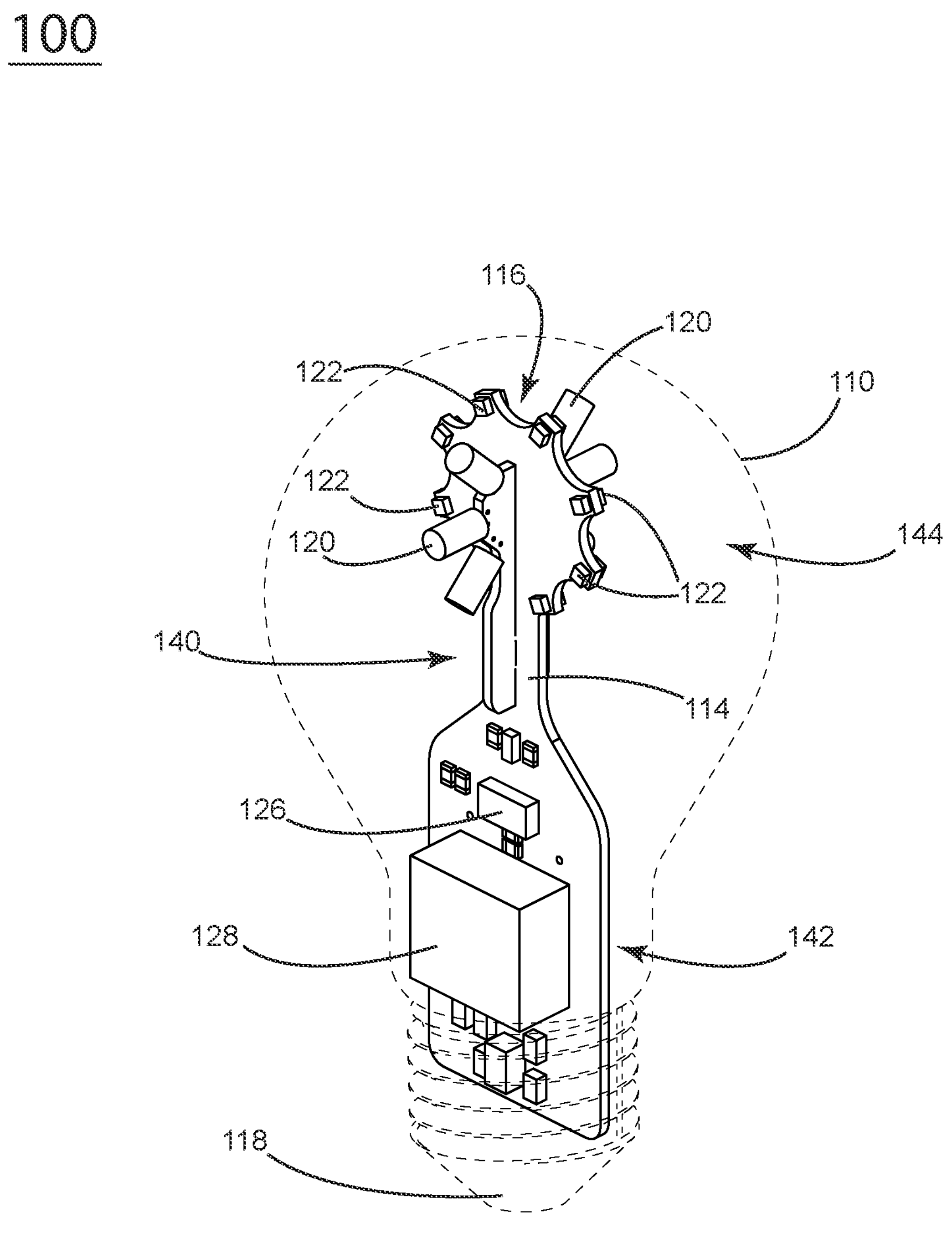
FIG. 1 is a front, right, perspective view of an example embodiment of the present disclosure.

A more complete understanding of the components, processes, and apparatuses disclosed herein can be obtained by reference to the accompanying figures. These figures are intended to demonstrate the present disclosure and are not intended to show relative sizes and dimensions or to limit the scope of the exemplary embodiments.

Although specific terms are used in the following description, these terms are intended to refer only to particular structures in the drawings and are not intended to limit the scope of the present disclosure. It is to be understood that like numeric designations refer to components of like function.

Figure 2:
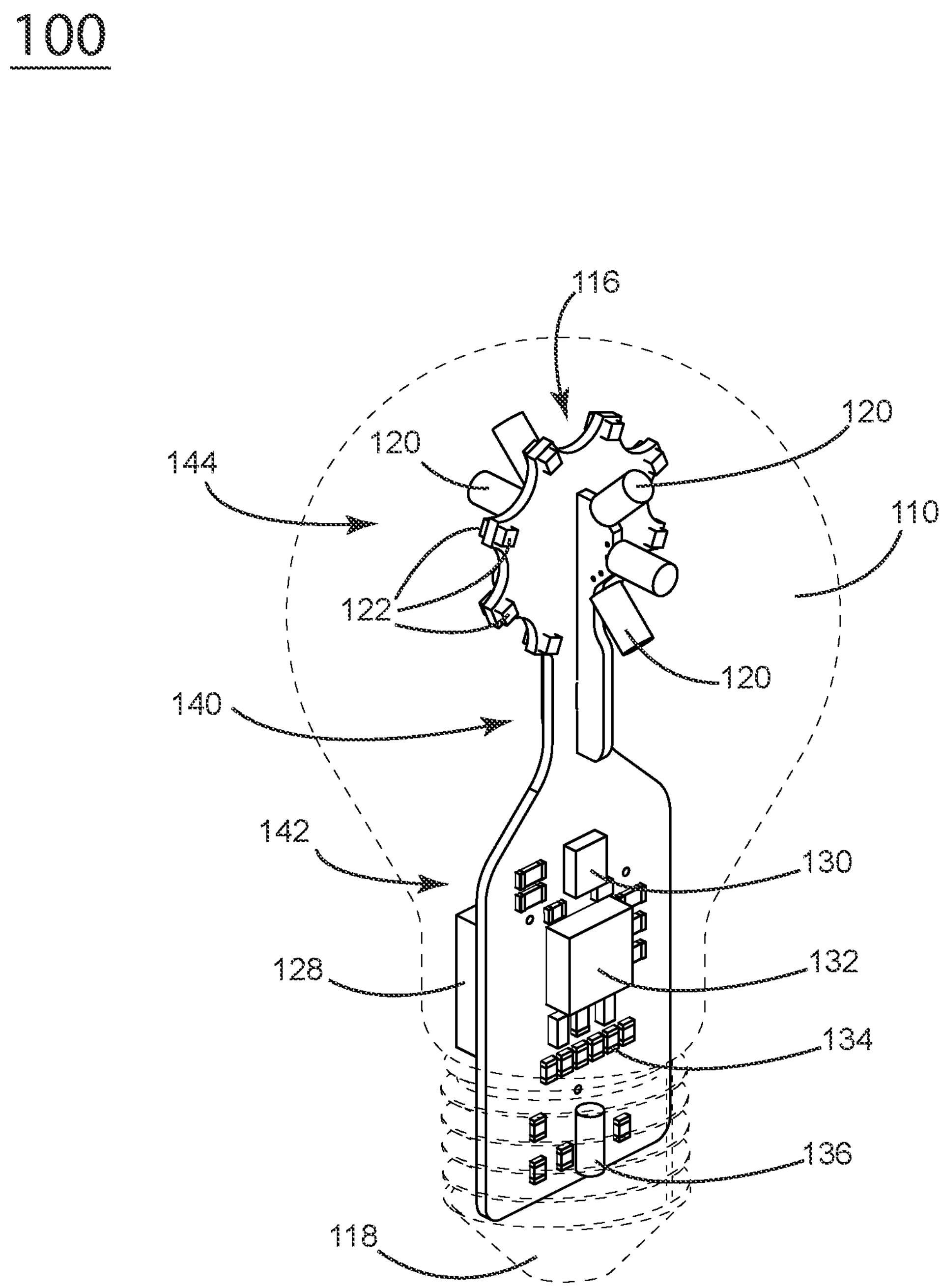
FIG. 2 is a rear perspective view thereof.
Figure 3:
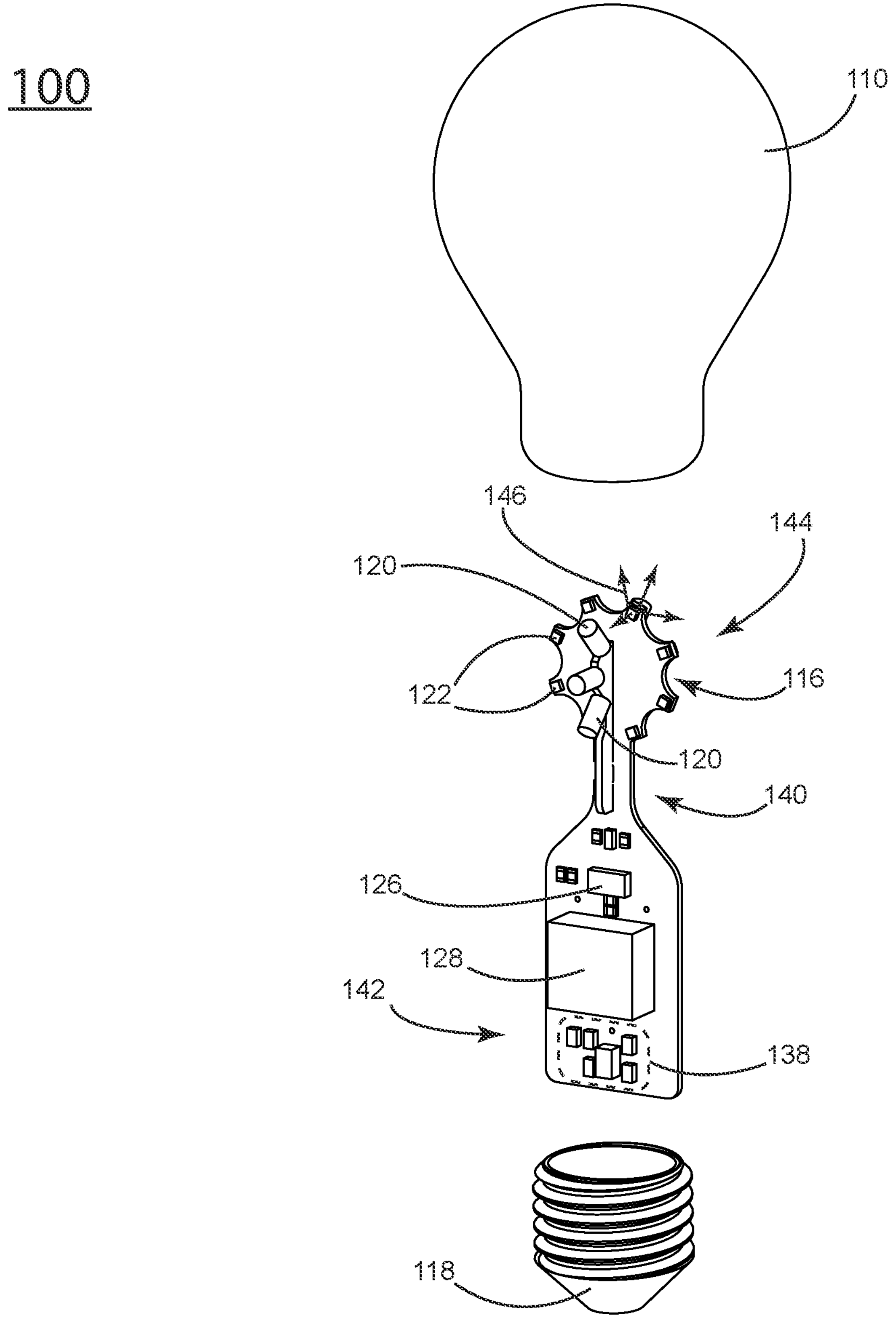
FIG. 3 is a perspective, exploded view thereof.

Referring to FIG. 1, FIG. 2 and FIG. 3, an example embodiment 100 is depicted in the illustration. An enclosure, also referred to as a glass globe 110 with a screw base 118 is shown in dashed lines in FIG. 1 and FIG. 2. One skilled in the art is familiar with the various sizes and shapes of lighting enclosures and electrical connection bases of common lamps, one such variation is depicted in the illustration for clarity. A Printed Circuit Board (PCB) 114 fits within the enclosure 110 and supports control and illumination electronics. The PCB 114 has a narrow neck 140 between a lower section 142 and an upper section 144. The upper portion 144 of the PCB is generally circular with a scalloped edge. Scallops 116 are arranged circumferentially between LED packages 122. In some embodiments, LED packages 122 are mounted on both sides of the PCB 114. One skilled in the art understands that a single sided PCB may be preferable to a double sided PCB depending on the design of the enclosure 110. A PAR lamp, for example, may benefit from a single sided PCB with LED packages 122 and incandescent lamps 120 on one side of a PCB. In some embodiments, some of the LED packages may be configured to produce a warm-light color in the range of 1800-2200 Kelvin while other LED packages may be configured to produce a cool-light color in the range of 2200-4000 Kelvin. An array of incandescent lamps 120 are mounted on the PCB 114. In some embodiments the incandescent lamps 120 are mounted on both sides of the PCB 114. Scallops 116 allow for light from the LED packages to shine through to the opposite side of the PCB as shown by arrows 146 (FIG. 3). In embodiments that employ 5-sided LEDs light from the 5-sided LEDs shines through scallops 116 to the opposite side of the PCB 114 preventing shadowing effect. One skilled in the art understands that shadowing may occur when structural elements such as a PCB board or control electronics interrupt the light from one or more LEDs and cast a shadow in the emitted light. Furthermore, the narrow neck 140 is designed to minimize material surrounding the LEDs and incandescent lamps, allowing light to emit in a spherical direction without shadowing, mimicking the illumination from a common incandescent light bulb.

Figure 4:
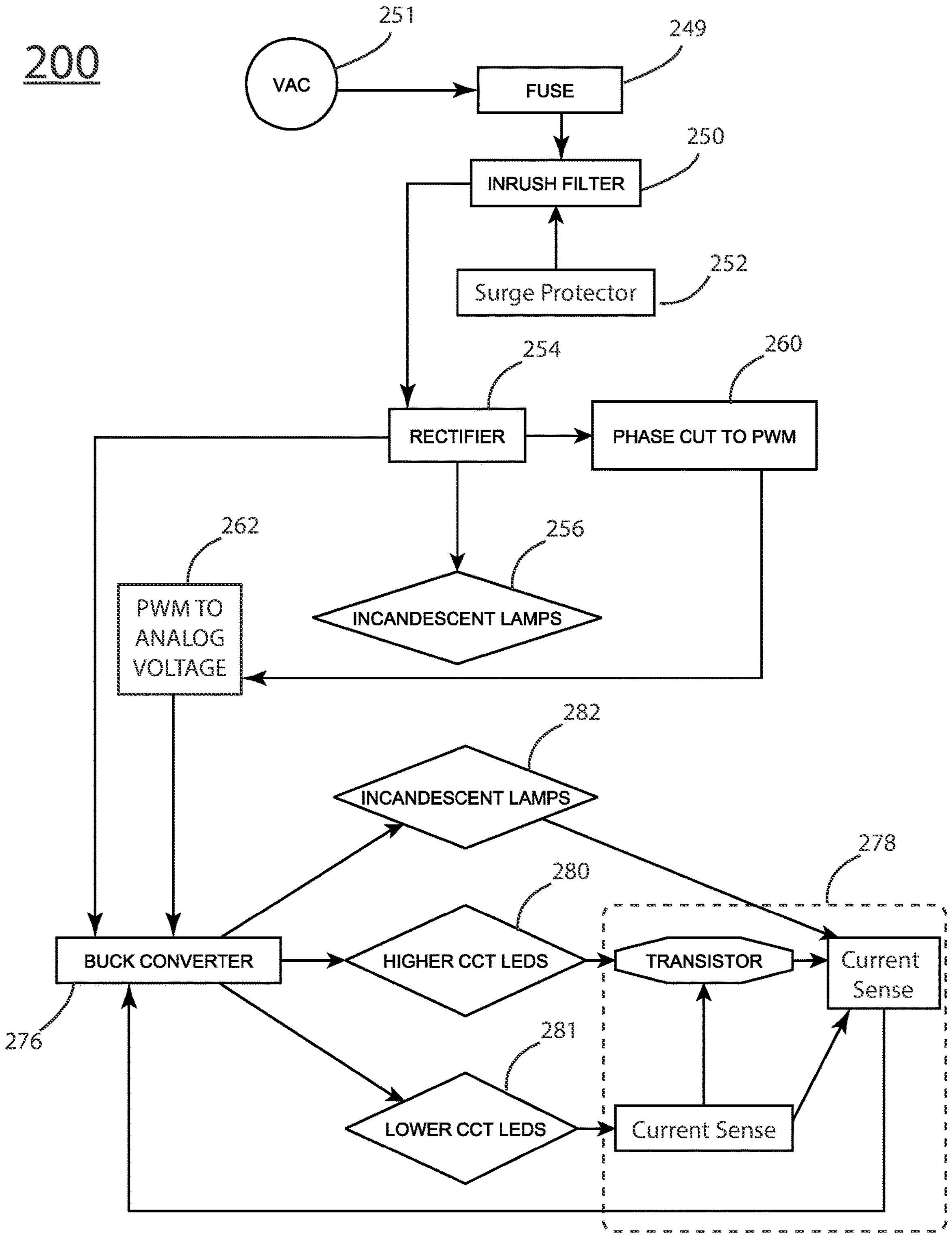
FIG. 4 is a flow chart of a circuit of the embodiment.
Figure 5:
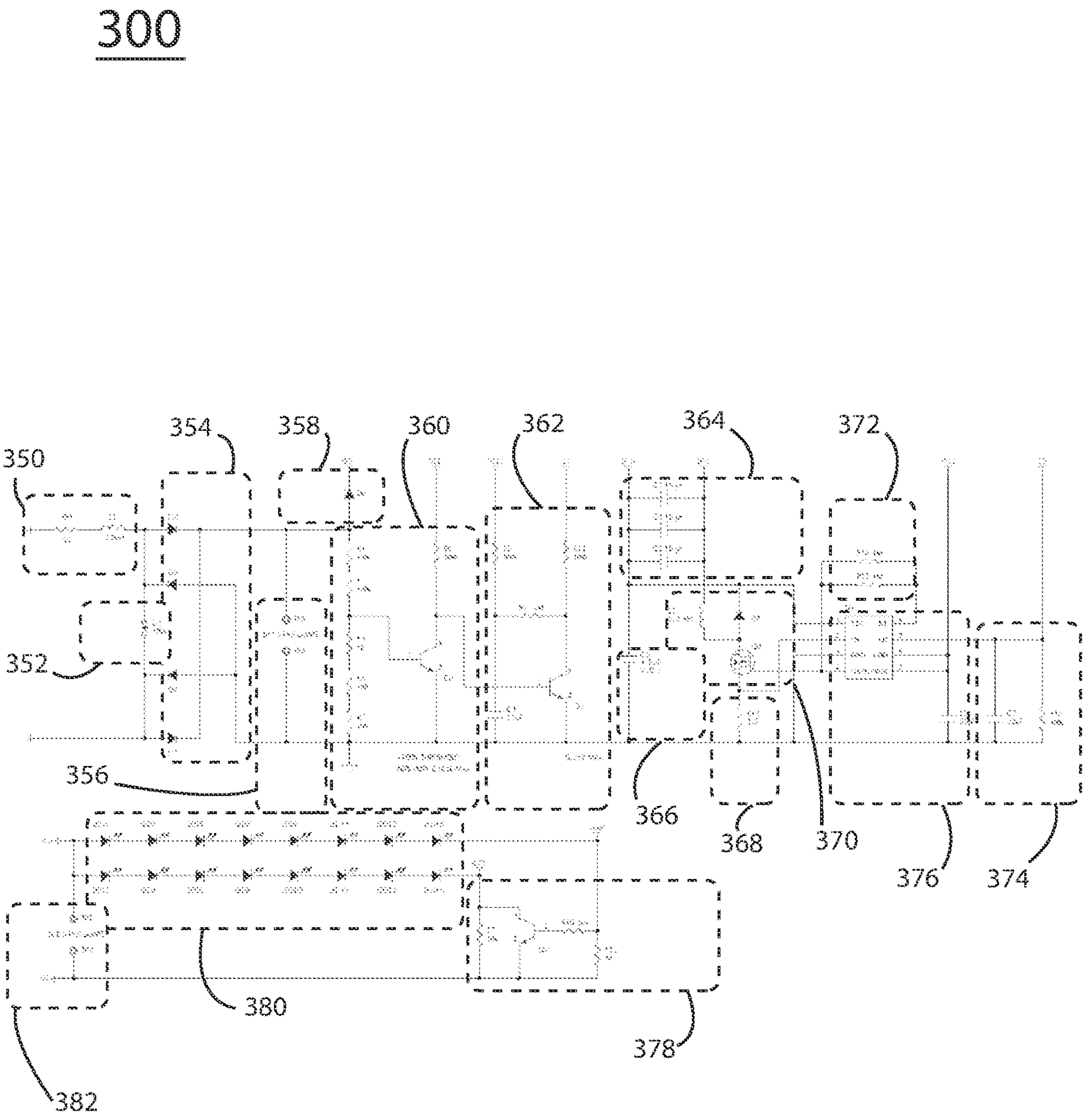
FIG. 5 is a circuit diagram thereof.

Although a more detailed description of the control electronics and their function is shown in FIG. 4 and FIG. 5, some of the control electronics are depicted in the illustrations in FIG. 1, FIG. 2 and FIG. 3. A number of control electronics are mounted on the lower section 142 of the PCB 114, including a Metal Oxide Silicone Field Effect Transistor (MOSFET), a film capacitor 128, an LED driver integrated circuit 130, an inductor 132, capacitors 134 and resistor 136. One skilled in the art understands that rearrangement of the electronic components is common between bulb sizes and styles. One example arrangement is shown here and is not intended to be limiting.

FIG. 4 is a diagram 200 depicting the overall function of the circuit. The circuit is powered by AC Voltage 251 and a fuse 249 disconnects the circuit in the event of a failure, a fault, or damage. An inrush filter 250 reduces inrush current spikes, such as those present in noisy electrical environments. A surge protector 252 protects electronic components against voltage surges from exterior equipment and lightning. A rectifier 254 rectifies AC input voltage to the square root of 2 times the RMS AC Voltage 251. A first array of incandescent lamps 256 provide a warm dim light while maintaining a holding current which stabilizes forward phase dimmers. A first converter 260 converts high voltage phase angle dimming to a low voltage pulse width modulation (PWM) signal. A second converter 262 converts PWM control signal to an analog dimming signal which creates what is referred to as a soft-start. Current from the second converter 262 and from the rectifier 254 flows to the buck converter 276, also referred to as a main switching converter. The buck converter 276 sends current to a second array of incandescent lamps 282, an array of relatively higher correlated color temperature (CCT) LEDs and an array of relatively lower CCT LEDs. As the light output transitions from dim to bright current is directed from the first array of incandescent lamps 256, to the second array of incandescent lamps 282 to LEDs of relatively lower CCT 281 and finally to LEDs of relatively higher CCT 280, providing warmest light when the light is dim and relatively cooler light when the light is bright, this may be referred to as a warm-dim or dim-to-warm effect. Circuitry 278 provides feedback to the buck converter 276 to control the warm-dim effect.

FIG. 5 is a circuit diagram 300 that demonstrates the electrical components, arrangement and function of the components of the disclosure. A resistor and inductor 350 make up a portion of the circuit that reduces inrush current spikes from forward-phase (TRIAC) dimmers. One skilled in the art understands that inrush current may cause damage to electronic components and produce what is referred to as a buzzing sound. A surge protector 352 protects electronic components against voltage surges from exterior equipment. A rectifier 354 rectifies AC input voltage to −170 VDC. A first array of incandescent lamps 356 provide a warm dim light while maintaining a holding current which stabilizes forward phase dimmers. A diode 358 is referred to as a blocking diode which ensures proper operation of a first converter 360 which converts high voltage phase angle dimming to a low voltage pulse width modulation (PWM) signal. A second converter 362 converts PWM control signal to a low voltage analog dimming signal which creates what is referred to as a soft-start. In some embodiments a PWM control signal is converted to an analog dimming signal. An array of ceramic capacitors 364 smooth LED driver output. A film capacitor provides LED driver bulk storage. A resistor 368 sets constant current output of the LED driver. A series of components make up a high-frequency/high-efficiency switching loop 370. Timing resistors 372 sets operation frequency and mode, also referred to as a constant-off time. A low pass filter 374 provides additional smooth analog control voltage with a bleeder resistor. A high voltage buck converter 376 is also referred to as the main switching converter. A series of components 378 controls a dim-to-warm effect of warm and cool LEDs. Warm and cool LEDs 380 provide light at the relatively brighter range of output. A second array of incandescent lamps 382 stabilize LED driver output particularly at low voltage, also referred to as dim output.

Figure 6:
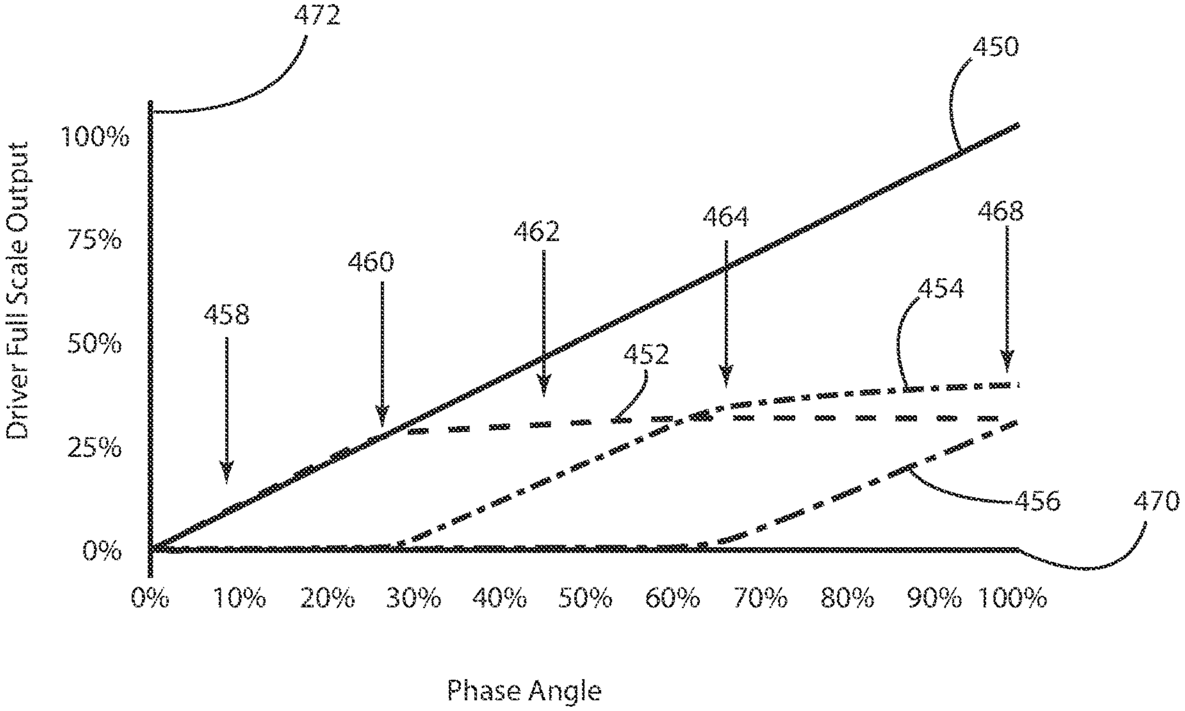
FIG. 6 is a graphic representation of the illumination of the embodiment from dim to bright.

FIG. 6 is a graph 400 depicting an example embodiment of a light source providing changing CCT between dark at a phase angle of 0% and bright at a phase angle of 100%. Phase angle is measured between 0% and 100% along the horizontal axis 470 and relative output current is measured along the vertical axis 472. The current draw of the incandescent lamps is denoted by dashed line 452. The current drawn by low CCT LEDs, also referred to as warm white LEDs, having a CCT of ~1800K, is denoted by dashed line 454. The current drawn by relatively high CCT LEDs, also referred to as cool white LEDs, having a CCT of ~2700K, is denoted by dashed line 456.

In the area denoted by arrow 458, with a phase angle of approximately 10%, incandescent lamps draw all current providing a dim, warm light. In the area denoted by arrow 460, with a phase angle of approximately 25% current begins to be directed to relatively low CCT LEDs, also referred to as warm CCT LEDs, in addition to the incandescent lamps that are nearly at full intensity. In the area denoted by arrow 462, with a phase angle of approximately 45% warm CCT LEDs draw increasing current and incandescent lamps are held at ~65% of their capacity. One skilled in the art understands that the life of an incandescent lamp held to a maximum of ~65% of their capacity will result in an extended life incandescent lamp. In the area denoted by arrow 464, with a phase angle of approximately 65% cool white LEDs turn on. In the area denoted by arrow 468, with a phase angle of 100%, a combination of ~1800K LEDs and ~2700K LEDs are combined to provide a light with a CCT of ~2200K.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A combination LED and incandescent lamp, comprising:

an array of LED packages arranged inside a glass container; and an array of incandescent packages arranged inside said glass container; and a circuit configured to generate analog control voltage; wherein said circuit powers said array of LED packages where relatively cooler, bright light is emitted, said circuit powers said array of incandescent packages where relatively warmer, dim light is emitted.

2. The lamp of claim 1, wherein the lamp is configured for warm dimming, further comprising:

a first array of LED packages that emits a light of a first correlated color temperature; and a second array of LED packages that emits a light of a second correlated color temperature; wherein said first array of LED packages emits a relatively warmer correlated color temperature and said second array of LED packages emits a relatively cooler correlated color temperature.

3. The lamp of claim 1 wherein;

said array of incandescent packages emit a light of a color temperature in the range of 1200K to 2300K.

4. The lamp of claim 2 wherein the first array of LED packages emits a light of a correlated color temperature that is between about 1800K to 2200K and the second array of LED packages emits a light of about 2200 to 4000K.

5. A method of illuminating the lamp of claim 1 from a light of a color temperature of about 1600K to 2000K dim light to a light with a correlated color temperature of about 2200K to 4000K; the method comprising:

powering said array of incandescent packages to a color temperature of about 1650K at a phase angle of approximately 10%;

powering said array of LED packages at a phase angle of 25%;

continuing to power said array of LED packages and said array of incandescent packages at a phase angle of 45%;

holding said array of incandescent packages to approximately 65% capacity;

continuing to power said array of LED packages and said array of incandescent packages;

producing a light of a correlated color temperature of about 2200 to 4000K at a phase angle of 100%.

6. A method of illuminating the lamp of claim 4 from a light of a color temperature of about 1600K to 2000K to a light with a correlated color temperature of about 2200K to 4000K; the method comprising:

powering said array of incandescent packages to a color temperature of about 1650K at a phase angle of approximately 10%;

powering said array of LED packages that emit a light of a correlated color temperature of about 1800K to 2200K at a phase angle of 25%;

continuing to power said array of LED packages that emit a light of a correlated color temperature of about 1800K to 2200K and said array of incandescent packages at a phase angle of 45%;

holding said array of incandescent packages to approximately 65% capacity;

continuing to power said array of LED packages that emit a light of a correlated color temperature of about 1800K to 2200K and said array of incandescent packages from a phase angle of 65% to 100% and;

powering said array of LED packages that emit a light of a correlated color temperature of about 2200K to 4000K from a phase angle of 65% to 100%;

producing a light of a correlated color temperature of 2200 to 4000K at a phase angle of 100%.

7. A combination LED and incandescent lamp for warm dimming, comprising:

a printed circuit board fixedly engaged inside a glass container;

said printed circuit board having a top portion and a bottom portion, at least a segment of said top portion being a radius with a scalloped circumference; and an array of 5-sided LED packages arranged on said printed circuit board proximal to said scallops; and an array of incandescent packages arranged on said printed circuit board; and a circuit configured to generate analog control voltage; wherein and said circuit powers said array of LED packages where relatively cooler, bright light is emitted, said circuit powers said array of incandescent packages where relatively warmer, dim light is emitted; and said 5-sided LED packages shine a portion of their light through said scallops mitigating shadowing effect.

8. The lamp of claim 7 wherein;

said bottom portion being relatively narrower than said top portion provides a narrow neck; wherein said LED packages and said incandescent packages arranged about said top portion produce a light that emanates from the center of said lamp, imitating a traditional incandescent bulb.

9. The lamp of claim 8 wherein the area of said top portion is about 33% of the cross sectional area of the bulb.

* * * * *